Sept. 20, 1966　　　　　R. L. FONASH　　　　　3,273,382
APPARATUS TO DETERMINE HORIZONTAL AND VERTICAL
　　　　　　　　LOADS IN LANDING GEAR OF AIRCRAFT
Filed Aug. 20, 1963　　　　　　　　　　　　　　2 Sheets-Sheet 1

INVENTOR.
RAYMOND L. FONASH
BY
　　Arthur L. Collins
ATTORNEY

Sept. 20, 1966  R. L. FONASH  3,273,382
APPARATUS TO DETERMINE HORIZONTAL AND VERTICAL
LOADS IN LANDING GEAR OF AIRCRAFT
Filed Aug. 20, 1963  2 Sheets-Sheet 2
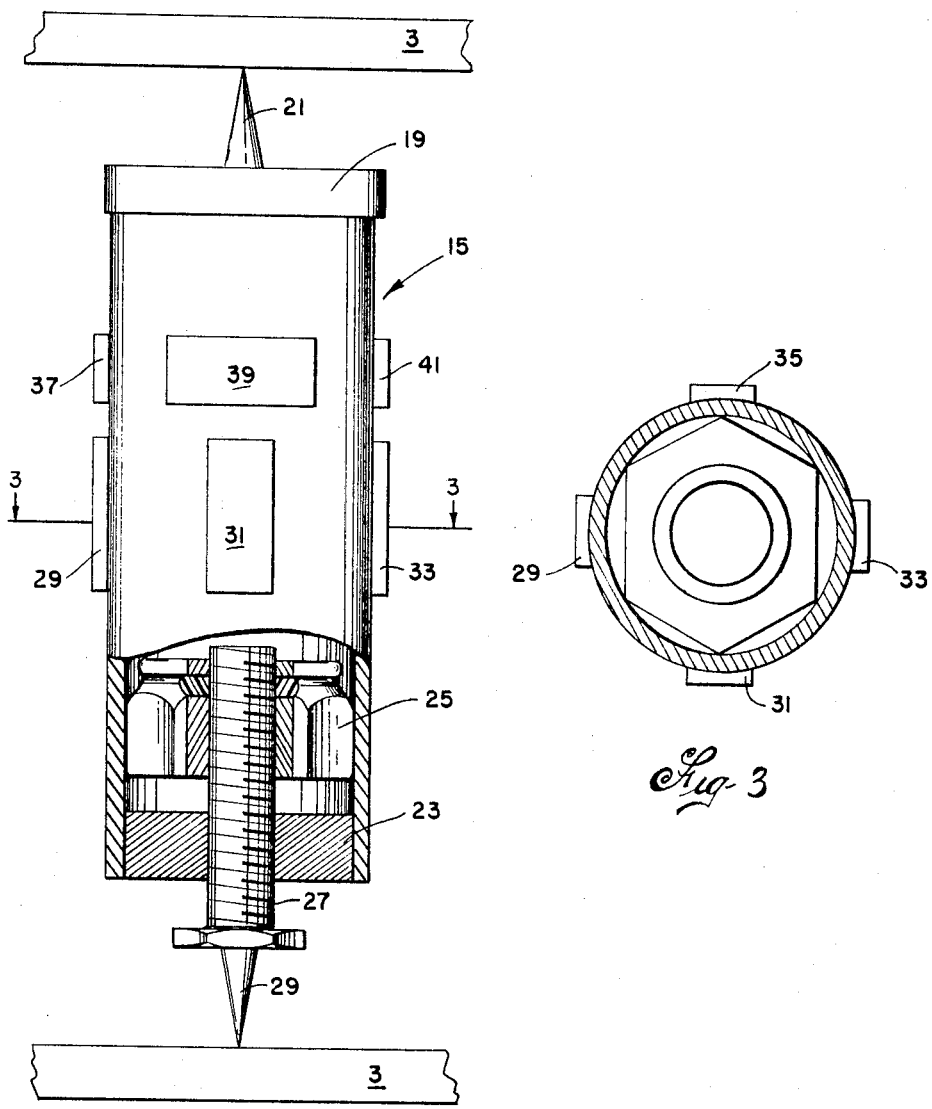
INVENTOR.
RAYMOND L. FONASH
BY
ATTORNEY 3,273,382
APPARATUS TO DETERMINE HORIZONTAL AND VERTICAL LOADS IN LANDING GEAR OF AIRCRAFT
Raymond L. Fonash, Haverford, Pa., assignor to the United States of America as represented by the Secretary of the Navy
Filed Aug. 20, 1963, Ser. No. 303,452
1 Claim. (Cl. 73—88.5)

The invention described herein may be manufactured and used by or for the Government of the United States of America for governmental purposes without the payment of any royalties thereon or therefor.

The present invention relates to a novel and improved method or technique of determining fatigue and other design parameters for a structure subjected to repeated variable loads. More specifically the invention relates to a novel and improved method for measuring the horizontal and vertical ground loads applied to aircraft landing gear structures during repeated landing and take-off operations.

In designing parameters of the landing gear of various types of aircraft, the study of actual loads repeatedly applied to such structures is often of considerable value. In the past, in order to perform such studies, it has been necessary to remove the landing gear structure from the aircraft, to secure strain gages to the structure, to calibrate the gages by simulating actual landing loads expected to be applied to the structure, and to reassemble the calibrated gear on the aircraft. Current methods of conducting design studies of this type have therefore often been found cumbersome, time consuming, and relatively unreliable.

Accordingly, it is a principal object of the present invention to provide a novel and improved method of measuring and recording ground loads applied to aircraft landing gear structures during actual landing and takeoff operations.

It is a further object of the present invention to provide a novel and improved method of accumulating fatigue and other design data for aircraft landing gear structures whereby the highly sensitive strain gages to be used may be permanently disposed within the axle of the landing gear structure itself.

Other objects and many of the attendant advantages of this invention will be readily appreciated as the same becomes better understood by reference to the following detailed description when considered in connection with the accompanying drawings wherein:

FIG. 2 is a detailed view of one of the proving rods used in the present invention;

FIG. 3 is a sectional view taken along reference line 3—3 of FIG. 2; and

Figure 1:
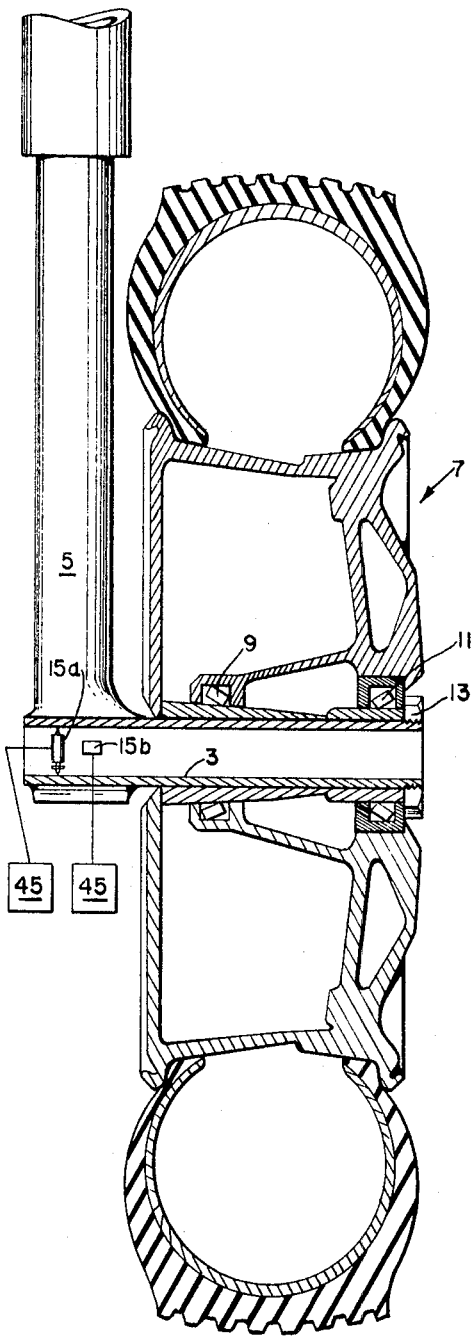
FIG. 1 is a cross sectional view of a landing gear structure on which providing rods are secured within its axle in accordance with the present invention.

Referring now to FIG. 1 of the drawing, it will be seen that the tubular axle or the like 3 is integrally secured to the main landing gear strut 5 of the aircraft in any suitable manner. The wheel assembly 7 is rotatably mounted on axle 3 in any conventional manner preferably by means of the tapered roller type bearings 9 and 11 and is secured on the axle 3 by a suitable bearing retaining nut or the like 13.

Tubular proving rods 15a and 15b are positioned within the axle 3 respectively on its horizontal and vertical axes in a manner which will be described more fully hereinafter. Details of the tubular proving rods used in the invention are best shown in FIG. 2 of the drawing. As shown therein, a suitable end cap or plate 19 having a generally pointed exterior projection 21 centered on the longitudinal axis of each rod assembly 15 is secured to one end of each rod. A second end plate or the like 23 having an aperture centered on the longitudinal axis of each rod assembly 15 is secured to the other end of each rod. A conventional elastic stop nut or the like 25 also centered on the longitudinal axis of each rod 15 is secured a predetermined distance within the rod 15 from end plate 23. An extension screw or stud 27, having a generally pointed external extremity 29, threadedly engages both the end plate 23 and stop nut 25. Four highly sensitive active strain gages 29, 31, 33 and 35 are cemented to the peripheral surface of each rod on opposed diameters that are mutually perpendicular in the manner indicated in FIGS. 2 and 3 of the drawing. Four similar strain gages 37, 39, 41 and 43 which automatically compensate for temperature variations of rod 15 are cemented to the peripheral surface of each rod on axes adjacent and respectively transverse to the axes of gages 29, 31, 33 and 35.

Figure 4:
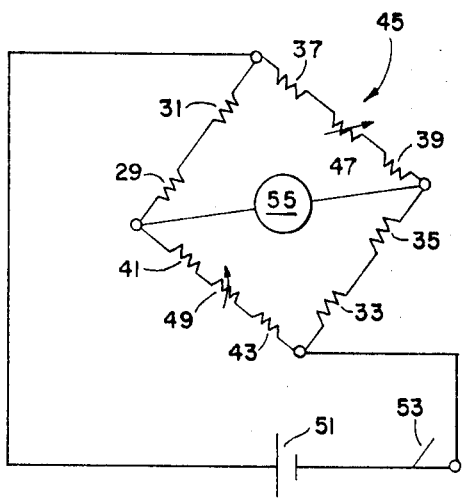
FIG. 4 is a preferred embodiment of the Wheatstone bridge circuit used in the present invention.

The eight strain gages mounted on each rod 15 are electrically connected in the Wheatstone bridge circuit 45 in the manner shown in FIG. 4 of the drawing. Variable resistors 47 and 49 are connected in opposite arms of the bridge circuit which include the temperature compensating gages. A suitable source of electrical energy 51 is connected through switch 53 between the junction of gages 33 and 43 and the junction of gages 31 and 37. A suitable galvanometer recorder device 55 is connected between the junction of gages 29 and 41 and the junction of gages 35 and 39.

In the practice of the present invention, the material from which the tubular rods 15 are constructed are first carefully selected such that the thermal coefficient of expansion is substantially identical with that of the material of the axle 3. The highly sensitive strain gages are then positioned about a suitably prepared smooth peripheral surface of each rod 15 in the pattern indicated in FIGS. 2 and 3 of the drawing. The proving rods 15 are then carefully calibrated statically and dynamically over a predetermined range of applied compression. A conventional device such as an optical transit is then preferably used to position the rods 15a and 15b on the horizontal and vertical axis of the aircraft axle preferably beneath the main landing gear strut 5 as shown or beneath both of the wheel bearings 9 and 11. A predetermined amount of compression is then applied to the tubular rods 15a and 15b within the axle 3 by rotating stud 27 in end plate 23 and lock nut 25 until in its extended position the generally pointed projection 21 of end plate 19 and the projection 29 of stud 27 securely engage the interior surface of axle 3. A suitable epoxy cement is then preferably used to permanently fix the rods 15 in their preadjusted horizontal and vertical positions within axle 3. The Wheatstone bridge 45 is then balanced by adjustment of variable resistors 47 and 49 or by a suitable external balancing network so that the precompressional stress applied to the rods 15a and 15b and their attached gages is nulled.

The rods, which are secured in the axle 3 in the above described manner, are then used to automatically measure and record all stresses applied to the landing gear of the aircraft during all subsequent landing operations.

Obviously many modifications and variations of the present invention are possible in the light of the above teachings. It is therefore to be understood that within the scope of the appended claim the invention may be practiced otherwise than is specifically described.

What is claimed is:

In aircraft landing gear having a tubular axle apparatus for continuously detecting ground loads applied to said landing gear, said apparatus comprising:
(a) a tubular proving rod constructed of material having a coefficient of thermal expansion similar to that of the said axle of the landing gear;
(b) four strain gages which are secured in quadrature on the exterior peripheral surface of the proving rod and which are calibrated after having been secured thereto;
(c) an end cap which is secured over one end of the tubular proving rod and which includes a pointed exterior projection centered on the longitudinal axis of the proving rod;
(d) an end plate which is secured in the other end of the proving rod and has a threaded aperture aligned with the longitudinal axis of the proving rod;
(e) a stud which is threadedly disposed in the aperture in the end plate and which includes a pointed exterior extremity that together with the pointed projection of the end cap engage opposite internal peripheral portions of the axle and support the proving rod on a predetermined axis therewithin;
(f) and means for detecting stress developed in the strain gages.

References Cited by the Examiner

UNITED STATES PATENTS

| | | | |
|---|---|---|---|
| 2,443,045 | 6/1948 | Magruder et al. | 73—65 |
| 2,550,588 | 4/1951 | Oberholtzer | 73—88.5 X |
| 2,722,587 | 11/1955 | Buzzetti et al. | 73—88.5 X |
| 2,759,356 | 8/1956 | Blackmon et al. | 73—65 |
| 3,141,327 | 7/1964 | Hartranft | 73—141 |
| 3,203,234 | 8/1965 | Westcott et al. | 73—141 |

FOREIGN PATENTS 226,589  6/1959  Australia.

RICHARD C. QUEISSER, *Primary Examiner.*

C. A. RUEHL, *Assistant Examiner.*